United States Patent [19]
Walker

[11] Patent Number: 6,127,797
[45] Date of Patent: Oct. 3, 2000

[54] LIGHT-OPERATED TELEPHONE AND METHOD OF OPERATION THEREOF

[76] Inventor: Mary Ann Walker, 7807 Rockhill, Houston, Tex. 77061

[21] Appl. No.: 08/979,675

[22] Filed: Nov. 26, 1997

[51] Int. Cl.$^7$ .................................................. H01M 10/46
[52] U.S. Cl. ............................................. 320/101; 320/114
[58] Field of Search ..................................... 320/101, 107, 320/112, 113, 114, 115, FOR 101, FOR 104, FOR 160; 136/244, 245, 291, 292, 293; 323/906

[56] References Cited

U.S. PATENT DOCUMENTS

| | | | |
|---|---|---|---|
| 3,466,446 | 9/1969 | Fassett | 250/199 |
| 4,441,143 | 4/1984 | Richardson, Jr. | 136/293 X |
| 4,590,620 | 5/1986 | Feldman | 455/614 |
| 4,794,272 | 12/1988 | Bavaro et al. | 307/66 |
| 4,882,770 | 11/1989 | Miyahira et al. | 455/603 |
| 4,905,270 | 2/1990 | Ono | 455/569 |
| 5,343,519 | 8/1994 | Feldman | 379/355 |
| 5,357,362 | 10/1994 | Azuma et al. | 359/151 |
| 5,579,388 | 11/1996 | Endroes et al. | 136/258 X |
| 5,592,074 | 1/1997 | Takehara | 363/131 |
| 5,644,207 | 7/1997 | Lew et al. | 320/101 |
| 5,701,067 | 12/1997 | Kaji et al. | 320/101 |
| 5,801,512 | 9/1998 | Adams et al. | 136/292 X |

*Primary Examiner*—Edward H. Tso
*Attorney, Agent, or Firm*—Michael B. Jolly

[57] ABSTRACT

This invention provides an improved light-operated telephone that comprises a solar array battery subsidizer or charger and a battery subsidized or charged by the solar array battery subsidizer or charger. The solar array battery subsidizer or charger comprises a solar array, power regulators connected to the solar array, negative and positive battery charging contacts connected to the power regulators, a housing in which the battery charging contacts are positioned and means for transmitting light connecting the solar array to the power regulators and connecting the power regulators to the battery charging contacts. In a preferred embodiment, the improved light-operated telephone has a double-sourced power. The solar rechargeable battery is one source of power (i.e. a primary power source) and is positioned in a primary cell which serves as a solar rechargeable battery compartment and is preferably covered by a crystal plate. In addition, a non-solar rechargeable battery is a secondary power source and is positioned in a secondary cell which serves as a non-solar rechargeable battery compartment. The first requirement for the operation of the solar array battery subsidizer is a light source. Light, received by photoelectric sensors, is converted into electromagnetic two-way power by the solar array. Voltage charge is controlled and regulated by the power regulators which avoid overcharge of the batteries. Light is transferred from the solar array to the power regulators and from the power regulators to the negative and positive battery charging contacts via the means for transmitting light. The solar battery is recharged or subsidized by the solar array battery subsidizer upon contacting the negative and positive battery charging contacts.

13 Claims, 4 Drawing Sheets

LIGHT-OPERATED TELEPHONE AND METHOD OF OPERATION THEREOF

BACKGROUND OF THE INVENTION

1. Field of the Invention

This invention relates to a light-operated telephone and method of operation thereof.

2. Description of the Prior Art

A wide variety of cordless telephones have been developed in the past few decades. The cordless telephone today is a relatively well-developed device. However, there is always a continuing need to improve features of components and operation of devices in almost every field including that of telephony.

Several patents that have been issued in the past few decades and are focused on numerous versions of telephones follow:

Azuma et al., U.S. Pat. No. 5,357,362, issued on Oct. 18, 1994, patent an optical telephone. The optical telephone uses an optical modulator that has an optical fiber guide means for guiding an optical fiber. The optical fiber has a U-shaped bending region formed in an optical transmission path. The optical telephone is arranged such that light that leaks from the U-shaped bending region is first converted into an electrical signal and is then demodulated into a voice.

Miyahira et al., U.S. Pat. No. 4,882,770, registered on Nov. 21, 1989, discuss a wireless optical short range communication system utilizing a single optical carrier frequency. The communication system includes a base station to interconnect via optical communication a group of similar physically spaced-apart, remote units. Each remote unit and the base unit include an optical emitter to transmit an optical message-carrying beam to the base station and an optical receptor to receive an optical message-carrying beam from the base station. Similarly, the base station includes an optical receptor and an optical emitter.

Feldman, U.S. Pat. No. 4,590,620, issued on May 20, 1986, patents an optical telephone in which amplitude modulated light is converted to sound. The modulated light is applied to an enclosed volume of gas. An optical fiber is used as the transmission element. The light entering side is covered with a positive lens and the optical fiber is positioned at the focal point of the lens.

Fassett, U.S. Pat. No. 3,466,446, issued on Sep. 9, 1969, patents a light-operated sound-signal telephone transmitter and transmission system comprising a light source, a pair of light polarizers and light detecting means, all arranged in optical alignment. One of the light polarizers is coupled to and driven by a diaphragm for converting sound signals to a vibrating translatory motion which is coupled to a suitable radius lever arm. Therefore, sound energy impinging on the diaphragm causes the light polarizer to be rotated and thereby modulate the light energy transmitted to the light detector in accordance with the sound signal.

The above-listed patents and many other similar inventions have been developed, some of which still exist in the market. The patents and innovations in the market describe various light-operated communication systems to replace many other conventional systems. Light-operated communication systems may be suitable for use in numerous applications, since light-operated systems do not require government licensing due to the fact that no electrical interference is created by the use of light-operated systems. However, the previously existing light-operated communication systems have not used light to recharge the power source of the communication system and were, thus, not able to achieve the results of the present invention.

In the past decade, an interest to a global environment has been emphasized and worthwhile attention has been paid to solar cells which represent battery power supplies which are inexhaustible and clean energy sources. The cost of solar cells has been constantly decreasing in the past few years, almost by 90% within the past few years. Several patents have been issued that are focused on numerous versions of solar cells:

Takehara, U.S. Pat. No. 5,592,074, issued on Jan. 7, 1997, patents a battery power supply system that comprises a solar cell array, a DC-AC inverter, a break device for a commercial power system and a wireless communication device used as a control device for controlling the conduction and break of the break device based on the information derived through wireless communication.

Bavaro et al., U.S. Pat. No. 4,794,272, issued on Dec. 27, 1988, patent a power regulator utilizing only battery current monitoring by adjusting the operating point of one source as a function of only the sensed current conditions of the secondary source. A solar array is controlled by a regulator which determines whether the battery is properly charging.

By using solar cells for cordless telephones in the present invention, not only is there a decrease in costs, there is also a conservation of energy and there is a use of a clean energy source (finally leading to a preservation of nature and of natural resources).

At the present state of the art, cordless telephones have many redundant, unnecessary expenses. By using solar cells for cordless telephones, this invention strives towards cutting some of such unnecessary expenses and developing a light-operated telephone with minimal cost and maximal efficiency. Upon cutting some of such unnecessary costs, a more economically priced system can be developed and marketed.

The conventional light-operated communication systems have a relatively poor transmission efficiency. Therefore, a higher power requirement is needed to compensate for the signal to noise ratio. A higher power consumption results in a premature drainage of the power source (e.g. the battery).

This invention strives towards having a relatively high transmission efficiency, and a low power consumption, for preventing rapid drainage of the power source.

Presently existing telephones regularly require recharging of their power source, such as batteries. The present invention aims at providing a new and improved light-operated telephone which does not require replacement of batteries and which does not require individually performed recharging of batteries.

Another goal of the new device is to ensure that the telephone does not suddenly or gradually loose power by being drained out. Many existing telephones are suddenly or gradually drained out of power and loose power either during conversation or when not in use.

In addition, cordless telephones are usually connected to power sources for recharge. A common example is a cordless telephone being connected to a cigarette lighter in an automobile for recharge. However, due to movements of the automobile and/or of the telephone, there is always a possibility of loss of connection of the telephone with the power source. Such losses of connection of the telephone with the power source are often without knowledge and/or desire and out of control of the user. The innovations of the improved light-operated telephone aim at avoiding loss of power of the telephone due to loss of connection of the telephone with the power source.

SUMMARY OF THE INVENTION

A primary object of the invention is to devise a new and improved wireless, light-operated telephone that is light in weight and portable.

Another object of this invention is to devise a highly efficient light-operated telephone that provides easy, efficient talking operation with high quality.

An additional object of this invention is to devise a new and improved light-operated telephone that allows a talking operation at an arbitrary place and for an arbitrary length of time.

Another object of this invention is to devise a new and improved light-operated telephone that is stable and that is relatively inexpensive to manufacture, to operate and to maintain.

Still another object of this invention is to devise a new and improved light-operated telephone that has a relatively high transmission efficiency, and a low power consumption from a power source, for preventing drainage of the power source.

Yet another object of this invention is to devise a new and improved light-operated telephone that provides an improved dynamic charging of battery upon flow of light.

An additional object of this invention is to devise a new and improved cordless, light-operated telephone that uses a two-way power system.

A final object of this invention is to provide a new and improved cordless, light-operated telephone that is relatively simple and economical.

Additional objects and advantages of the invention will be set forth in part in a detailed description which follows, and in part will be obvious from the description, or may be learned by practice of the invention.

The present invention provides an improved light-operated telephone that comprises a solar array battery subsidizer or charger and a battery subsidized or charged by the solar array battery subsidizer or charger. The solar array battery subsidizer or charger comprises a solar array, power regulators connected to the solar array, negative and positive battery charging contacts connected to the power regulators, a housing in which the battery charging contacts are positioned and means for transmitting light connecting the solar array to the power regulators and connecting the power regulators to the battery charging contacts.

In a preferred embodiment, the improved light-operated telephone has a double-sourced power. The solar rechargeable battery is one source of power (i.e. a primary power source) and is positioned in a primary cell which serves as a solar rechargeable battery compartment and is preferably covered by a crystal plate. In addition, a non-solar rechargeable battery is a secondary power source and is positioned in a secondary cell which serves as a non-solar rechargeable battery compartment.

The first requirement for the operation of the solar array battery subsidizer is a light source. Optimally, any natural setting would provide sufficient light to trigger the solar array. As soon as light is received by the solar array, the improved light-operated telephone is triggered. Light is first received by photoelectric sensors which are light-detecting means in the solar array. Light is then converted into electromagnetic two-way power by the solar array. Voltage charge is controlled and regulated by the power regulators which avoid overcharge of the batteries. In addition, light is polarized and analyzed by the power regulators. Light is transferred from the solar array to the power regulators and from the power regulators to the negative and positive battery charging contacts via means for transmitting light. The solar battery is recharged or subsidized by the solar array battery subsidizer upon contacting the negative and positive battery charging contacts.

It is to be understood that the descriptions of this invention are exemplary and explanatory, but are not restrictive, of the invention. Other objects and advantages of this invention will become apparent from the following specification and from any accompanying charts, tables, examples and drawings.

BRIEF DESCRIPTION OF CHARTS, TABLES, EXAMPLES AND DRAWINGS

Any accompanying charts, tables, examples and drawings which are incorporated in and constitute a part of this specification, illustrate examples of preferred embodiments of the invention and, along with the description, serve to explain the principles of the invention.

DETAILED DESCRIPTION OF THE PREFERRED EMBODIMENT

Preferred embodiments of the present invention are illustrated in any charts, tables, examples and drawings that are included.

The present invention provides an improved light-operated telephone 21, and more particularly a light-operated telephone 21 with an inexpensive, lasting solar array battery subsidizer or charger 7 (referred to hereafter as the "solar array battery subsidizer 7"). In the presence of a light source, light-operated telephones may perform several functions. In light-operated telephones, it is required to convert light to sound or to mechanical energy. On the other hand, light can be converted into electrical energy and then amplified and fed into an electromechanical transducer or earphone.

Figure 1:
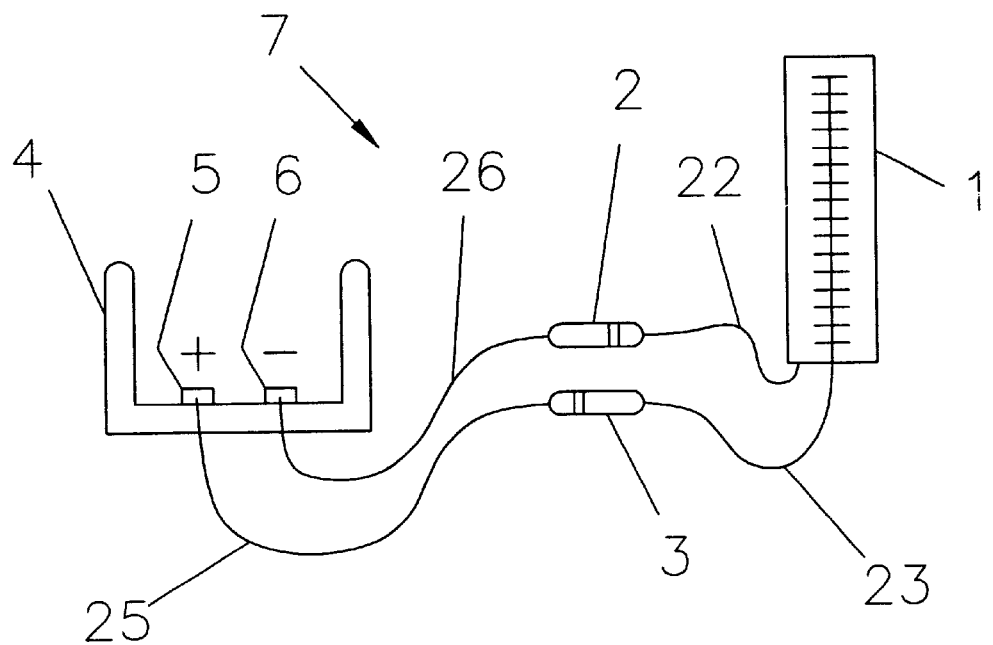
FIG. 1 shows a schematic view of a solar array battery subsidizer.

The present invention constitutes an improvement in light-operated telephones. The improved light-operated telephone 21 consists of the solar array battery subsidizer 7 and a solar rechargeable battery 24 (not shown) subsidized or charged by the solar array battery subsidizer 7. An embodiment of the solar array battery subsidizer 7 is shown in FIG. 1. The solar array battery subsidizer 7 is built into or removably or irremovably attached to or connected to the improved light-operated telephones 21 (shown in FIG. 2). The solar array battery subsidizer 7 comprises a solar array 1, power regulators 2,3 connected to the solar array 1, negative and positive battery charging contacts 6,5 (i.e. negative and positive charging contacts 6,5 of the solar rechargeable battery 24) connected to the power regulators 2,3, a housing 4 in which the negative and positive battery charging contacts 6,5 are positioned, means for transmitting light 22,23 connecting the solar array 1 to the power regulators 2,3 and means for transmitting light 26,25 connecting the power regulators 2,3 to the negative and positive battery charging contacts 6,5.

In a preferred embodiment, the improved light-operated telephone 21 has a double-sourced power. The solar rechargeable battery 24 is one source of power (i.e. a primary power source) and is positioned in a primary cell 28 (not shown) which serves as a solar rechargeable battery compartment (also referred to as a "solar cell"). The primary cell 28 is preferably covered by a crystal plate 27 (refer to FIG. 2). In addition, a non-solar rechargeable battery 29 (not shown) is used as a secondary power source. The non-solar rechargeable battery 29 is positioned in a secondary cell 30 which serves as a rechargeable battery compartment (refer to FIG. 2). As a result, if any external or internal damage occurs to the solar rechargeable battery 24, the non-solar rechargeable battery 29 is available as the secondary power source, preferably in a different location. In a preferred embodiment, the primary cell 28 is positioned on one end (referred to as "upper end 31") of a cordless light-operated telephone 21 and the secondary cell 30 is positioned on an opposite end (referred to as "lower end 32") of the cordless light-operated telephone 21. (please refer to FIG. 2.) However, such arrangements are optional and a matter of choice. As long as the double power source network is established and functions properly, the arrangement of the non-solar rechargeable battery 29 and the solar rechargeable battery 24 in relationship to one another is not an issue.

The components of the solar array battery subsidizer 7 are essential features of the improved light-operated telephone 21 and, therefore, are discussed in more detail. With the power regulators 2,3 being connected to the solar array 1, with the solar rechargeable battery 24 being subsidized or charged by the solar array battery subsidizer 7, with the negative and positive battery charging contacts 6,5 in the battery charging contacts housing 4 being connected to the power regulators 2,3 and with means for transmitting light 22,23 connecting the solar array 1 to the power regulators 2,3 and connecting the power regulators 2,3 to the battery charging contacts 6,5, a network is created for the transmission of light energy from the solar array 1 to the solar rechargeable battery 24 in order to recharge the solar rechargeable battery 24 consistently. As a result, the solar array battery subsidizer 7 automatically overrides the need for the non-solar rechargeable battery 29 which is intended to serve as the secondary power source. Since the solar cell is operative when there is a minimal amount of light, there is a backup means (i.e. the secondary power source) required as a support for the primary power source if the primary power source fails to function properly.

The solar array 1 comprises photoelectric sensors 33 (not shown in the figures) which are light-detecting means. The amount of light that is needed to trigger the photoelectric sensors 33 of the solar array 1 is minimal. Therefore, the photoelectric sensors 33 may be triggered even during night time if there is sufficient amount of light. Light is first received by photoelectric sensors 33. Light is then converted into electromagnetic two-way power by the solar array 1.

The solar array 1 converts sunshine to a DC power. The solar array 1 has a plurality of solar cell modules 34 (not shown). A photo-electromotive device such as single crystal silicon, poly-crystalline silicon, amorphous silicon or a combination thereof may be used as the solar cell module 34. The amount of solar cell modules 34 of the solar array 1 depends upon the size of the solar rechargeable battery 24 that the solar array 1 will be subsidizing or charging. Naturally, the larger is the solar rechargeable battery 24 that the solar array 1 is subsidizing or charging, the larger is the amount of solar cell modules 34 of the solar array 1. For example, to form a 240 V-440 W solar array 1, 20 amorphous silicon solar cell modules 34 are needed since amorphous silicon solar cell modules 34 have a rated voltage of 12 volts and a rated power of 22 watts. Chargeable batteries 24 have been previously used to subsidize or charge other chargeable devices such as light-operated calculators, but the application of solar rechargeable batteries 24 to light-operated telephones 21 by using zener diodes 2,3 is what makes the present invention novel and non-obvious.

In any system containing multiple power sources, a regulator is used to determine how the power sources will be used to satisfy the load demands for power. In the present invention, the solar array 1 is typically operated over a range of current-and-voltage combinations which are different from voltage and current of the primary power source or the voltage of the secondary power source and, therefore, the present invention also includes power regulators 2,3. Preferably, zener diodes are used as the power regulators 2,3.

In a preferred embodiment, the power regulators 2,3 are connected to the primary power source. The power regulators 2,3 convert the power supplied under the current and voltage combination established by the solar array 1 at a given array operating point to the current and voltage that is compatible with the primary power source. The power regulators 2,3 ensure that the operating point of the solar array 1 is adjusted such that the power requirements of the primary power source are fully satisfied. Variations in light availability cause varying power availability from the solar array 1. The present invention utilizes maximum power available from the solar array 1 by using the primary power source. A charge or load is shared with the primary power source when the power supply is overcharged or overloaded (referred to hereafter as "overcharged" i.e. the effective charge impedance is lower than that which is necessary to achieve maximum available power). In addition, when the power supply is undercharged or underloaded (referred to hereafter as "undercharged" i.e. the effective charge impedance is greater than that necessary to achieve maximum available power), the primary power source is used as an additional charge. When the power supply is overcharged, the primary power source is available for the purpose of supplying power to the load during periods when the solar array 1 is not capable of providing sufficient power.

With the power regulators 2,3 being connected to the primary power source, the power regulators 2,3 are used to avoid overcharge and undercharge of the primary power source. The power regulators 2,3 determine whether the primary power source is in the required charging condition. If the available power from the solar array 1 exceeds the demand (i.e. upon occurrence of an overcharging condition), the power regulators 2,3 can be used to adjust the solar array 1 to operate at a point below maximum capability. Upon occurrence of overcharging conditions, operation is adjusted so as to continue the charging of the primary power source according to predetermined power source specific voltagetemperature or current limits, particularly for batteries. If the load exceeds the power available from the solar array 1 (i.e. upon occurrence of an undercharging condition), the power regulators 2,3 can adjust the solar array 1 to operate at its maximum power and use the primary power source to satisfy the excess demands. During undercharging conditions, the primary power source is charged from output power of the solar array 1 and is discharged by the load demands that are in excess of the available power from the solar array 1. In such case, the primary power source serves as an augmentation battery for supplying needed power to the load under conditions where load demands exceed a given presently generated output-power level from the solar array 1. In addition, the solar array 1 is adjusted so as to minimize undercharging of the primary power source. If the solar array 1 fully satisfies the demand by the loads for power, the power regulators 2,3 maintain the primary power source in a fully-charged, ready condition at all times. If the solar array 1 is unable to satisfy the load demands, the power regulators 2,3 adjust the solar array 1 to operate at the maximum power point and the primary power source supplies the remaining load demand. However, it is critical that the power regulators 2,3 be able to promptly and quickly determine whether the load demands exceed the maximum capabilities of the primary power source and to make correct adjustments.

In another preferred embodiment, the power regulators 2,3 regulate the power between the primary power source and the secondary power source. The primary power source and the secondary power source are both connected to the power regulators 2,3. During undercharging conditions of the solar array 1 and the primary power source, the secondary power source is automatically applied.

The solar array 1 is connected to the power regulators 2,3 which serve as voltage charging controllers. Zener diodes 2,3 are silicon semi-conductor devices that are particularly used as voltage regulators. Control signals from the power regulators 2,3 are essentially derived from a monitoring of an output current such as the battery current. While power is being supplied by the solar array 1 through the voltage regulators to the light-operated telephone 21, the primary power source is being charged as well.

The power regulators 2,3 serve as light polarizing and analyzing means. The power regulators 2,3 are connected to the negative and positive battery charging contacts 6,5 in the housing 4 for the negative and positive battery charging contacts 6,5. Means for transmitting light 22,23 are used to connect the solar array 1 to the power regulators 2,3. Also, means for transmitting light 26,25 are used to connect the power regulators 2,3 to the negative and positive battery charging contacts 6,5. The negative and positive battery charging contacts 6,5 are mounted within a suitable housing 4 for the negative and positive battery charging contacts 6,5.

The light-operated telephone 21 has control means 44 (not shown in the drawings) that turns the secondary power source on and off. The control means 44 preferably consists of a switch for starting and stopping the secondary power source and for separating the primary power source from the secondary power source.

Figure 2:
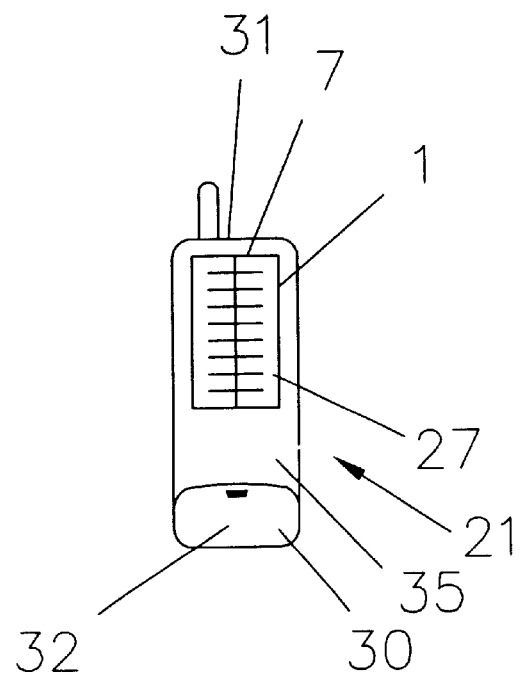
FIG. 2 shows a schematic front view of an improved light-operated telephone.
Figure 3:
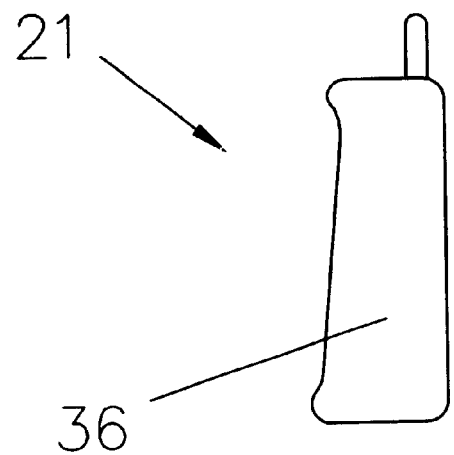
FIG. 3 shows a schematic back view of the improved light-operated telephone of FIG. 2.

The solar array battery subsidizer 7 may be used on light-operated telephones 21 with various structures and designs. As shown in FIG. 2 and FIG. 3, the solar array battery subsidizer 7 may be built into an improved, cordless, light-operated telephone 21 and serve as part of the light-operated telephone 21. The solar array battery subsidizer 7 is attached to the light-operated telephone 21 in a manner to ensure that the solar array 1 is in some way exposable to light. In a preferred embodiment of the improved, cordless, light-operated telephone 21 comprising a front side 35 and a back side 36, the solar array battery subsidizer 7 would be detectable on a front view of the light-operated telephone 21 (referring to FIG. 2). However, the power regulators 2,3, the negative and positive battery charging contacts 6,5, the housing 4 for the negative and positive battery charging contacts 6,5, the means for transmitting light 22,23 connecting the solar array 1 to the power regulators 2,3 and the means for transmitting light 26,25 connecting the power regulators 2,3 to the negative and positive battery charging contacts 6,5 of the primary power source would preferably not be detectable neither from the front side 35 nor from the back side 36. As viewed on FIG. 3, the back side 36 of the improved light-operated telephone 21 does not include any components of the solar array battery subsidizer 7.

Figure 4:
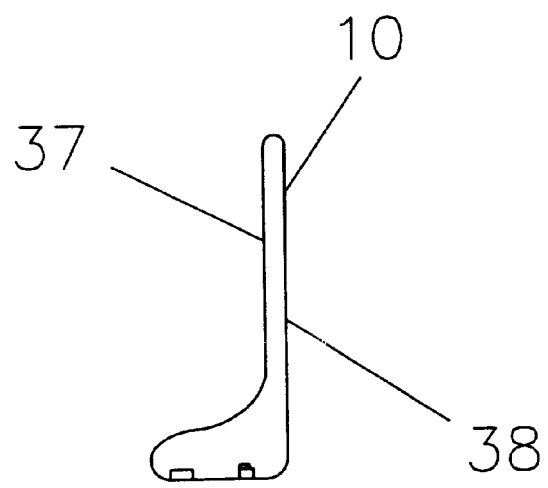
FIG. 4 shows a schematic side view of a base that serves as a solar array battery subsidizer for a telephone that is not light-operated or that is not operated by a solar rechargeable battery.
Figure 5:
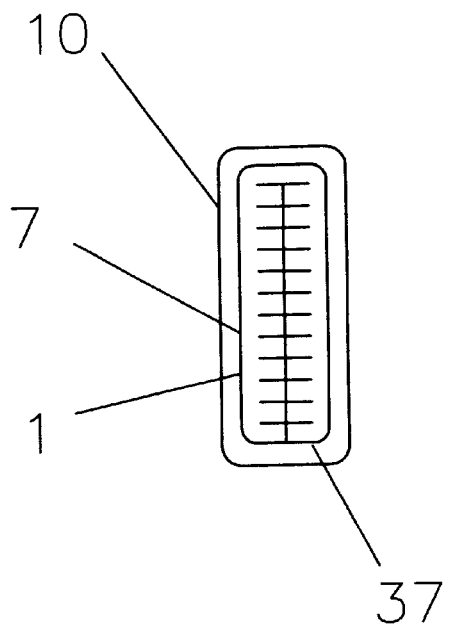
FIG. 5 shows a schematic back view of the base of FIG. 4.

The solar array battery subsidizer 7 may also be built onto a base 10 (refer to FIGS. 4 and 5.) The base 10 has a front side 38 and a back side 37. The solar array battery subsidizer 7 is attached to the back side 37 of the base 10 such that an improved light-operated telephone 21 (not shown) may be clipped onto the back side 37 of and may be held within the base 10. Thus, the solar array battery subsidizer 7, and thus the solar array 1, are seen when the base 10 is seen from behind (a back view). A front view, a side view or a top view of the base 10 does not show the solar array battery subsidizer 7.

Figure 6:
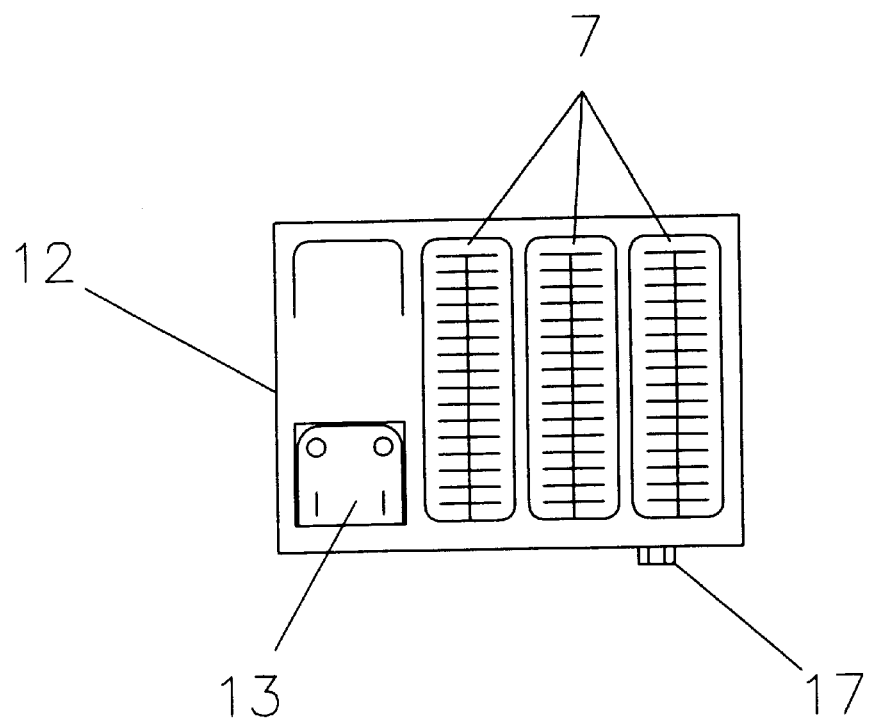
FIG. 6 shows a schematic top view of a base that serves as a solar array battery subsidizer for a telephone that is not light-operated or that is not operated by a solar rechargeable battery.
Figure 7:
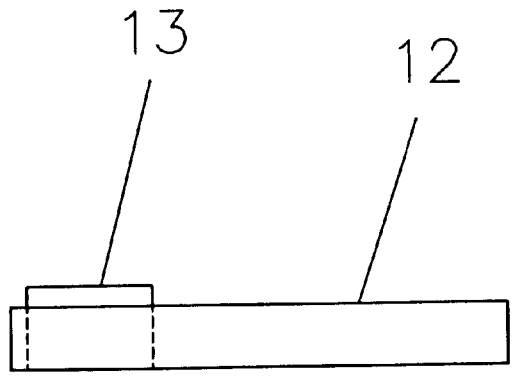
FIG. 7 shows a schematic side view of the base of FIG. 6, with an adapter used for clipping on telephones being in a lowered position.
Figure 8:
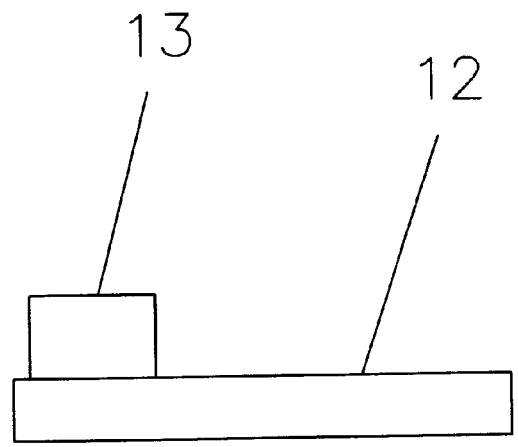
FIG. 8 shows a schematic side view of the base of FIG. 6, with the adapter being in a raised position.

Bases 10 can be adjusted to clip on different structures and shapes of telephones. Bases 12 are designed that have a larger solar array battery subsidizer 7 and that support cordless light-operated telephones 21 (not shown) that may be laid flatwise or that may be held perpendicularly upwards when being charged. (Please refer to FIG. 6) A telephone adapter 13 is shown in FIG. 6 as well. In FIG. 7, a side view of the telephone adapter 13 is shown in a down position, wherein the telephone adapter 13 may take a horizontally positioned light-operated telephone 21 (not shown). In FIG. 8, the side view of the telephone adapter 13 is shown in an up position wherein the telephone adapter 13 may take a vertically positioned light-operated telephone 21 (not shown). The base 12 shown in FIG. 6 also includes a plug 17 from which a portable electrical device, such as a radio or a tape recorder, may be operated.

In the present invention, several factors are required in the operation of the solar array battery subsidizer 7. The first requirement is a light source (not shown). The light source can be natural or artificial. Optimally, any natural setting would provide sufficient light to trigger the solar array 1. As soon as light is received by the solar array 1, the improved light-operated telephone 21 is triggered. Light is first received by photoelectric sensors 33 which are light-detecting means in the solar array 1. Light is then converted into electromagnetic two-way power by the solar array 1. Voltage charge is controlled and regulated by the power regulators 2,3 in order to avoid overcharge of the primary power source. In addition, light is polarized and analyzed by the primary power source. Light is transferred from the solar array 1 to the power regulators 2,3 and from the power regulators 2,3 to the negative and positive battery charging contacts 6,5 via means for transmitting light 22,23 and 26,25, consecutively and correspondingly. The solar rechargeable battery 24 is recharged or subsidized by the solar array battery subsidizer 7 upon contacting the negative and positive battery charging contacts 6,5.

By such simple procedure and in a few steps described above, the solar rechargeable battery 24 of the light-operated telephone 21 is subsidized or charged by the solar array battery subsidizer 7. As long as the solar array battery subsidizer 7 functions properly and performs its task, there is no need for a secondary power source. If there is any damage to the solar array battery subsidizer 7 or to the solar rechargeable battery 24 such that the solar rechargeable battery 24 cannot provide the required amount of power, then the non-solar rechargeable battery 29 that is positioned in the secondary cell 30 would be needed. As a result, if any external or internal damage occurs to the solar rechargeable battery 24, the non-solar rechargeable battery 29 is used and applied as a secondary power source. A description of the application of the secondary power source is not deemed necessary since the secondary power source is a non-solar rechargeable battery 29 that is being presently used in cordless telephones.

The capacity and rate of activity of the solar array 1 varies in synchronism with the instantaneous amount, energy or intensity of the light that is present or available.

Several procedures of operation exist. In a preferred embodiment, the primary power source is started and operates singly while the primary power source is in an "ON" state and the secondary power source is in an "OFF" state. Meanwhile, the secondary power source can be manually turned on at any time. The electromagnetic two-way power can only be manually turned off and cannot be automatically turned off. The primary power source is recharged by the solar array 1. As long as sufficient light is provided, the primary power source continues to be recharged. Thus, not only is the primary power source capable of operating singly, it is also capable of being automatically recharged during operation if there is at least a minimal amount of light. When the minimal amount of light is not available for the primary power source to be recharged, the primary power source can be operated singly without being recharged by the solar array 1. However, there is a limitation to the stored power in the primary power source when there is less than the minimal amount of light. In such cases, it is prudent to keep the secondary power source turned on and available for cases of emergency as a back-up supply. In yet another embodiment, the primary power source is operated jointly with the secondary power source, the primary power source is recharged by the solar array 1 and the secondary power source serves as a back-up for the primary power source.

The use of the solar array 1 reduces the cost of light-operated communication system when compared with many existing light-operated communication systems, by reducing the number of required circuits. With the batteries being charged by a solar array 1, there is a reduced number of components. The reduced number of components decreases substantially the premature drainage of the power source, by reducing the power consumption of the light-operated communication system. In addition, the reduced number of components facilitates the portability of the light-operated communication system by reducing its overall size and weight.

In previously existing patents (U.S. Pat. No. 5,592,074), the electricity generated by solar cells was calculated to be more expensive than commercial electrical power as of 1994, but it was said that the cost of the solar cell would go down to the cost of commercial electrical power in 2000, when electricity would be generated by the solar cell with a comparable cost to that of the commercial power supply. However, in the present invention, the cost of the solar cell is much less than the cost of commercial power supply.

In addition to having a primary power source and a secondary power source, the light-operated telephone 21 may have an AC adaptor for recharging. However, such an adaptor would probably never be used and be solely for emergency purposes.

This invention strives towards having a relatively high transmission efficiency, and a low power consumption, for preventing rapid drainage of the power source. With the above-described arrangements, the light-operated telephone 21 can be operated and high-quality talk can be easily and efficiently performed without a need for independently-performed charging of the light-operated telephone 21 and of the batteries.

The present invention may be used with other light-operated communication systems. Each communication system receives light transmitted from any particular source or receives light from the surrounding atmosphere.

Certain objects are set forth above and made apparent from the foregoing description, drawings and examples. However, since certain changes may be made in the above description, drawings and examples without departing from the scope of the invention, it is intended that all matters contained in the foregoing description, drawings and examples shall be interpreted as illustrative only of the principles of the invention and not in a limiting sense. With respect to the above description and examples then, it is to be realized that any descriptions, drawings and examples deemed readily apparent and obvious to one skilled in the art and all equivalent relationships to those stated in the examples and described in the specification or illustrated in the drawings are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

What is claimed as invention is:

1. A light-operated telephone with a solar array battery subsidizer or charger and a primary solar rechargeable battery subsidized or charged by the solar array battery subsidizer or charger, with the solar array battery subsidizer or charger, and a secondary rechargeable battery power source recharged by a non-solar battery charger, comprising:

(a) a solar array;

(b) power regulators connected to the solar array;

(c) negative and positive battery charging contacts connected to the power regulators and connected to the solar rechargeable battery;

(d) a housing in which the negative and positive battery charging contacts are positioned;

(e) means for transmitting electrical signals/power connecting the solar array to the power regulators and means for transmitting electrical signals/power connecting the power regulators to the negative and positive battery charging contacts; and (f) a secondary rechargeable battery power source which provides power to the telephone if power from the primary solar battery fails and which is recharged by a non-solar battery charger.

2. The light-operated telephone according to claim 1, wherein the solar array battery subsidizer or charger is irremovably attached to the light-operated telephone, such that the solar array is exposable to light.

3. The light-operated telephone according to claim 1, wherein the solar array battery subsidizer or charger is irremovably attached to a base to which the light-operated telephone can be removably attached, such that the solar array is exposable to light.

4. The light-operated telephone according to claim 1, wherein the solar array battery subsidizer or charger is irremovably attached to a base to which light-operated telephones and electrical devices can be removably attached.

5. The light-operated telephone according to claim 1, wherein the solar array comprises photoelectric sensors and a plurality of solar cell modules, with the amount of solar cell modules depending upon the size of the solar rechargeable battery that the solar array will be subsidizing or charging.

6. The light-operated telephone according to claim 5, wherein the solar cell module comprises a photo-electromotive device.

7. The light-operated telephone according to claim 6, wherein the photo-electromotive device consists of a single crystal silicon, polycrystalline silicon, amorphous silicon or a combination thereof.

8. The light-operated telephone according to claim 1, wherein the solar rechargeable battery is positioned in a primary cell that is covered by a crystal plate.

9. The light-operated telephone according to claim 1, wherein zener diodes are used as the power regulators.

10. The light-operated telephone according to claim 9, wherein the zener diodes are silicon semi-conductor devices that are particularly used as voltage regulators.

11. The light-operated telephone according to claim 1, wherein a non-solar rechargeable battery serves as a secondary power source and is positioned in a secondary cell.

12. The light-operated telephone according to claim 11, wherein the solar rechargeable battery and the non-solar rechargeable battery are both connected to the power regulators and are controlled by the power regulators to provide a double-sourced power for the light-operated telephone.

13. For a light-operated telephone provided with a solar array battery subsidizer or charger and a solar rechargeable battery subsidized or charged by the solar array battery subsidizer or charger, a method of operating the solar array battery subsidizer or charger, said method comprising:

(a) providing light to a solar array, whereby light is converted into electromagnetic two-way power;

(b) passing converted power to power regulators, via means for transmitting light that connect the solar array to the power regulators, to avoid undercharge and overcharge of the solar rechargeable battery;

(c) transferring power from the power regulators to negative and positive battery charging contacts, via means for transmitting light that connect the power regulators to the negative and positive battery charging contacts, to avoid undercharge and overcharge of the solar rechargeable battery; such that the solar rechargeable battery is recharged or subsidized, as needed, by the solar array battery subsidizer or charger upon contacting the negative and positive battery charging contacts; and (d) a non-solar rechargeable battery is used as a power source when the solar rechargeable battery is undercharged.

* * * * *